United States Patent
Katayama et al.

(10) Patent No.: US 10,953,629 B2
(45) Date of Patent: Mar. 23, 2021

(54) ROLLED GRAPHITE SHEET

(71) Applicant: KANEKA CORPORATION, Osaka (JP)

(72) Inventors: Satoshi Katayama, Osaka (JP); Yusuke Ohta, Tochigi (JP); Naoshi Marutani, Tochigi (JP); Yasushi Nishikawa, Osaka (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 16/156,099

(22) Filed: Oct. 10, 2018

(65) Prior Publication Data

US 2019/0039845 A1 Feb. 7, 2019

Related U.S. Application Data

(63) Continuation of application No. PCT/JP2017/014981, filed on Apr. 12, 2017.

(30) Foreign Application Priority Data

Apr. 12, 2016 (JP) .............................. JP2016-079438

(51) Int. Cl.
 *B32B 9/00* (2006.01)
 *C01B 32/205* (2017.01)
 (Continued)

(52) U.S. Cl.
 CPC ................ *B32B 9/007* (2013.01); *B32B 1/08* (2013.01); *C01B 32/20* (2017.08); *C01B 32/205* (2017.08);
 (Continued)

(58) Field of Classification Search
 CPC ....... C01B 32/20; C01B 32/205; C01B 32/21; C04B 35/522; B32B 9/007; B32B 1/08; Y10T 428/30
 See application file for complete search history.

(56) References Cited

U.S. PATENT DOCUMENTS

| | | | | |
|---|---|---|---|---|
| 2002/0117415 | A1* | 8/2002 | Fukugawa | ........... B65D 85/672 |
| | | | | 206/410 |
| 2011/0200812 | A1* | 8/2011 | Tomamoto | ............. B65H 18/28 |
| | | | | 428/220 |

(Continued)

FOREIGN PATENT DOCUMENTS

| | | |
|---|---|---|
| JP | H01-098549 A | 4/1989 |
| JP | H10-114450 A | 5/1998 |

(Continued)

OTHER PUBLICATIONS

Machine translation of JP H 10/114450A, obtained from J-PlatPat service of the JPO. (Year: 2019).*

(Continued)

*Primary Examiner* — Z. Jim Yang
(74) *Attorney, Agent, or Firm* — Osha Bergman Watanabe & Burton LLP

(57) ABSTRACT

A rolled graphite sheet includes a rod-shaped body and a graphite sheet having a length of 1 m or more and a width shorter than the length. The graphite sheet is wound around the rod-shaped body and is rolled in a length direction. When a length direction-end of the graphite sheet is pulled with a force of 1.5 N/cm in a direction parallel to a tangent of a cross-sectional circle of the rolled graphite sheet while fixing the rod-shaped body, the end moves 5 mm or less in the direction parallel to the tangent of the circle.

12 Claims, 6 Drawing Sheets

(51) Int. Cl.
*C01B 32/21* (2017.01)
*B32B 1/08* (2006.01)
*C01B 32/20* (2017.01)
*B65H 18/28* (2006.01)

(52) U.S. Cl.
CPC .............. *C01B 32/21* (2017.08); *B65H 18/28* (2013.01); *B65H 2301/4127* (2013.01); *B65H 2701/132* (2013.01); *B65H 2701/1752* (2013.01); *C01P 2006/10* (2013.01); *Y10T 428/30* (2015.01)

(56) References Cited

U.S. PATENT DOCUMENTS

| | | | | |
|---|---|---|---|---|
| 2012/0121880 | A1* | 5/2012 | Ohta | C01B 32/20 428/220 |
| 2013/0001350 | A1* | 1/2013 | Ohta | C04B 35/6269 242/525 |
| 2013/0119571 | A1* | 5/2013 | Ohta | C01B 32/21 264/29.1 |
| 2013/0164210 | A1* | 6/2013 | Ohta | C08G 69/26 423/448 |
| 2013/0240128 | A1* | 9/2013 | Mishiro | C01B 32/205 156/185 |
| 2014/0094331 | A1* | 4/2014 | Hansen | B32B 7/12 473/578 |
| 2014/0110869 | A1* | 4/2014 | Mishiro | B65D 85/671 264/29.1 |
| 2014/0112859 | A1* | 4/2014 | Mishiro | C04B 35/524 423/461 |
| 2014/0220308 | A1* | 8/2014 | Ohta | H01L 23/373 428/177 |
| 2014/0308484 | A1* | 10/2014 | Ohta | C01B 32/205 428/174 |
| 2014/0328745 | A1* | 11/2014 | Mishiro | C01B 32/205 423/460 |
| 2016/0332327 | A1* | 11/2016 | Li | B32B 9/007 |
| 2017/0050852 | A1* | 2/2017 | Ohta | C01B 32/20 |
| 2018/0016481 | A1* | 1/2018 | Terada | B32B 7/12 473/578 |
| 2018/0148339 | A1* | 5/2018 | Wu | B65D 85/672 206/410 |

FOREIGN PATENT DOCUMENTS

| | | |
|---|---|---|
| JP | 2001-249431 A | 9/2001 |
| JP | 2003-270762 A | 9/2003 |
| WO | 2011/102107 A1 | 8/2011 |
| WO | 2013/035237 A1 | 3/2013 |

OTHER PUBLICATIONS

International Search Report issued in International Application No. PCT/JP2017/014981, dated Jul. 4, 2017 (2 pages).

* cited by examiner

[Fig. 1A]
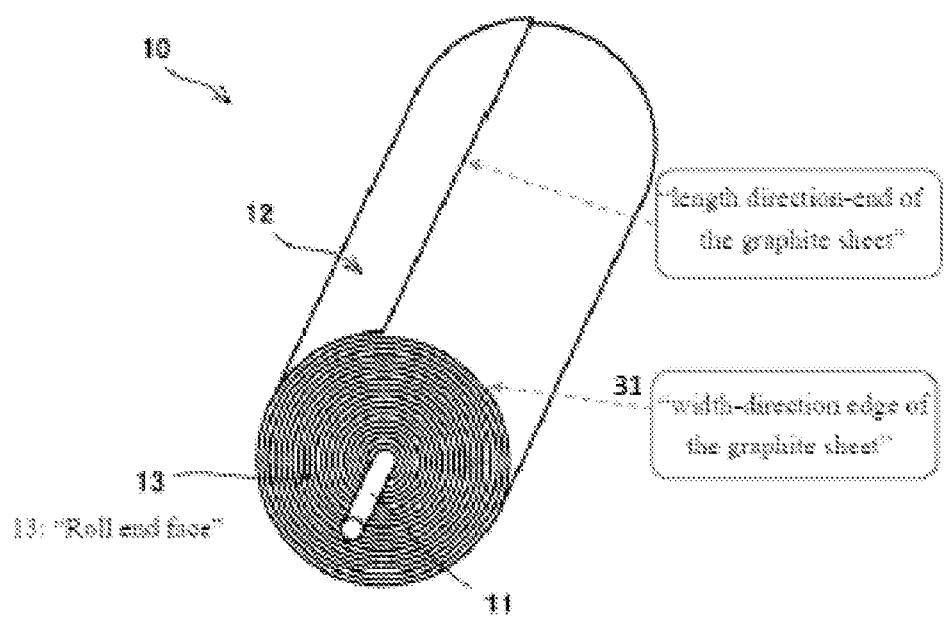

[Fig. 1B]
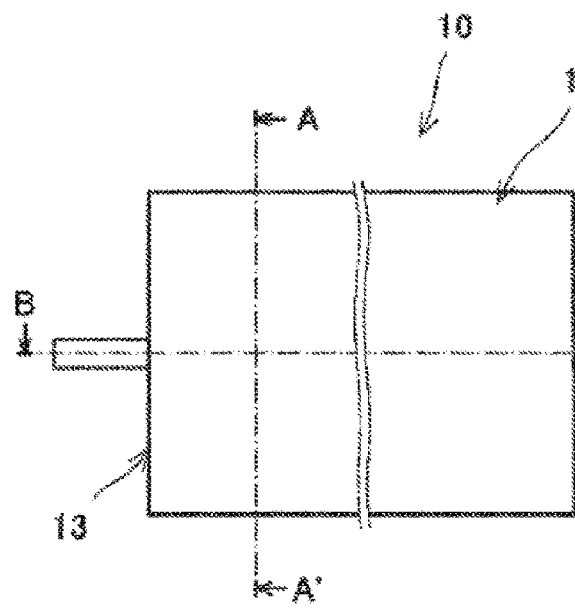
[Fig. 1C]
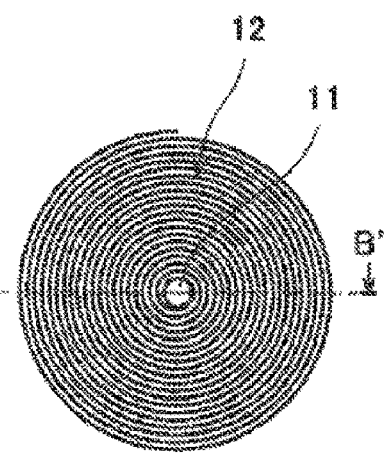
[Fig. 2]
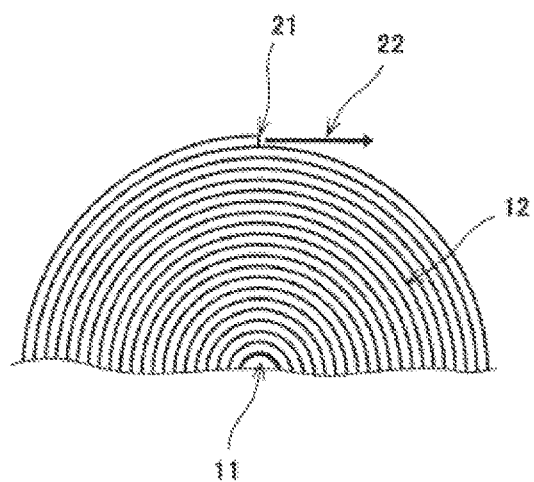

[Fig. 3]
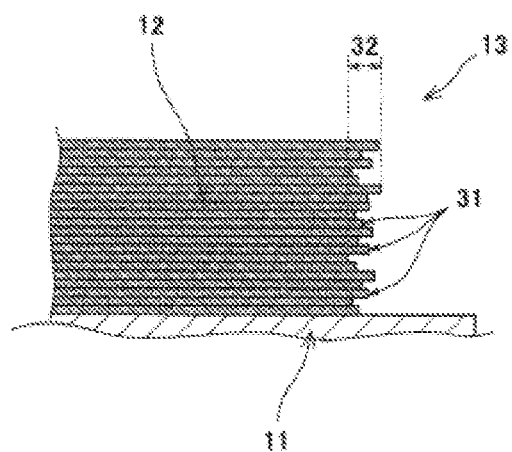
[Fig. 4]
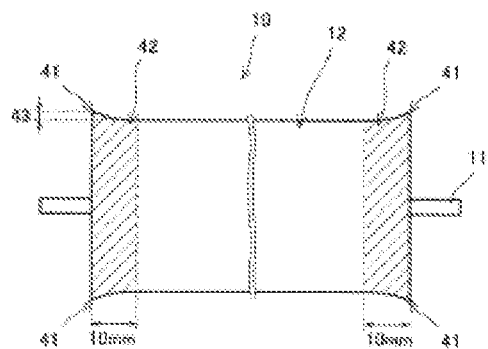

[Fig. 5]
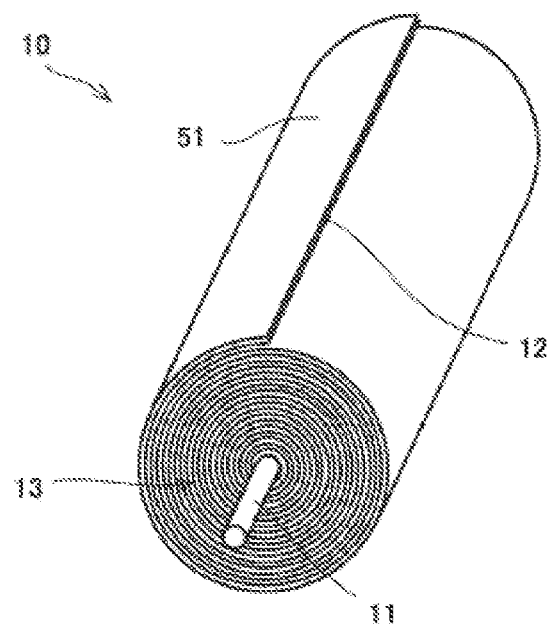
[Fig. 6]
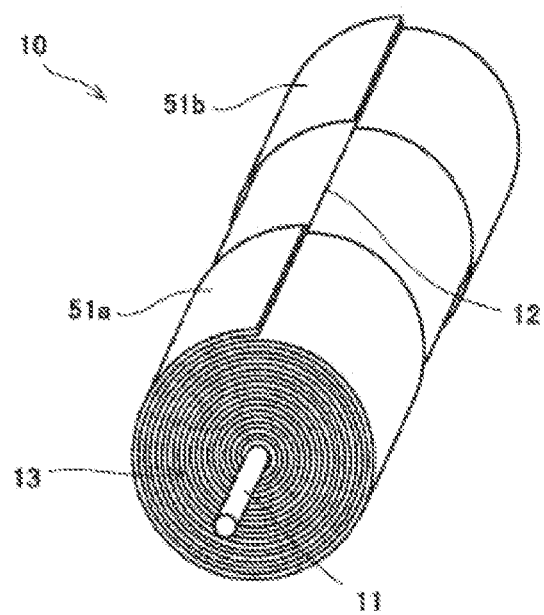

[Fig. 7]
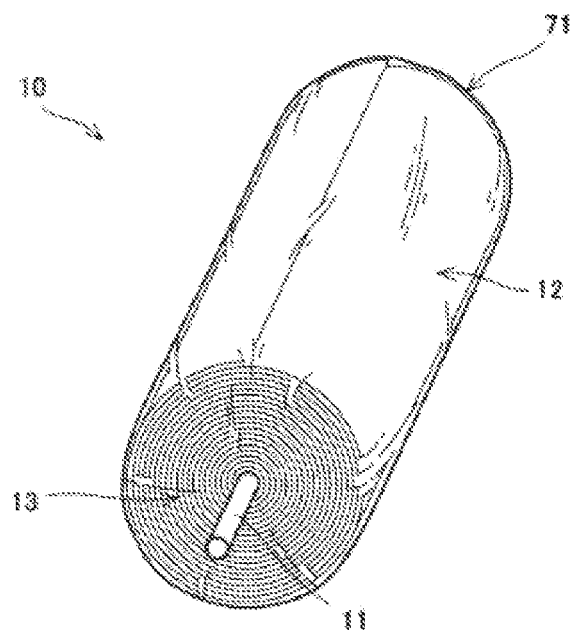
[Fig. 8]
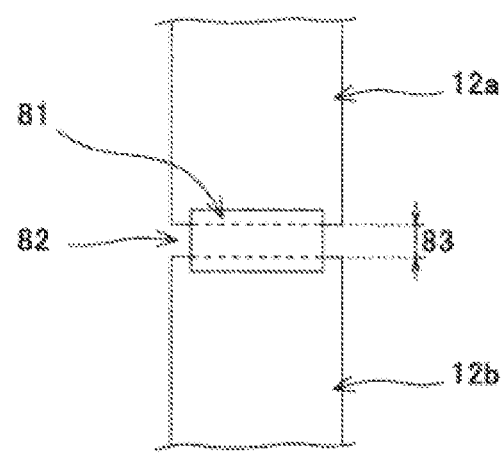

[Fig. 9]
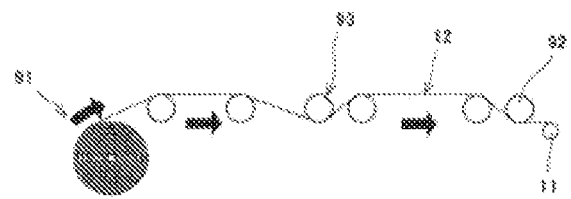
[Fig. 10]
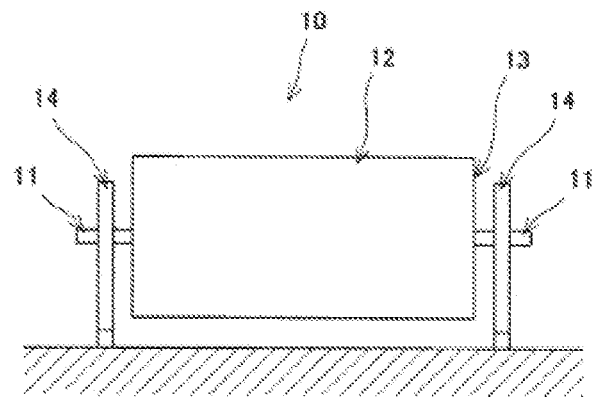

ROLLED GRAPHITE SHEET

TECHNICAL FIELD

One or more embodiments of the present invention relate to a rolled graphite sheet obtained by winding a long graphite sheet around a rod-shaped core member.

BACKGROUND

A graphite sheet is a material having excellent properties such as high thermal conductivity, and is widely used in electronic parts etc. Examples of a method for producing a generally-available highly thermal conductive graphite sheet include: an expansion method in which expanded graphite is pressed into a sheet; and a polymer thermal degradation method.

For example, PTL 1 discloses a method in which a roll of long polymer film is heat-treated to obtain a carbonaceous film, and then the carbonaceous film is heat-treated at a temperature of 2400° C. or higher.

CITATION LIST

Patent Literature

PTL 1: WO 2013/035237

However, it has been found that a rolled graphite sheet obtained by winding a long graphite sheet around a core member is likely to increase in the width direction of the sheet when the direction of the roll is changed or the roll is subjected to vibrations. The reason for this is considered as follows. A graphite sheet has slidability due to its smooth surface, and therefore slippage is likely to occur between graphite sheet layers when the graphite sheet layers are brought into contact with each other due to stacking. For example, when the roll is vertically or obliquely disposed or subjected to vibrations at the time of transportation, slippage is likely to occur between sheet layers of the roll. It is to be noted that the phrase "the roll is vertically disposed" means that the roll is disposed in such a manner that the rod-shaped core member is vertically directed, and the phrase "the roll is obliquely disposed" means that the roll is disposed in such a manner that the core member is obliquely directed with respect to a vertical direction.

When such slippage occurs between sheet layers so that the sheet layers shift in the width direction of the graphite sheet (sheet shifting), the edges of the stacked sheet layers are not aligned, and therefore unevenness (projections and depressions) is observed in the roll end faces of the rolled graphite sheet. Slight unevenness of the roll end faces is acceptable. If, however, unevenness of the roll end faces is too large, cracking is likely to occur at the side edges of the sheet when an impact is given to the roll end faces because the impact is concentrated on projections. This is because the graphite sheet is inherently easy to crack.

SUMMARY

One or more embodiments of the present invention provide a rolled graphite sheet in which a sheet shift, that is, unevenness of its roll end faces due to directional changes or vibrations is less likely to increase.

One or more embodiments of the present invention are directed to a rolled graphite sheet that includes: a rod-shaped body; and a graphite sheet having a length of 1 m or more and wound around the rod-shaped body, in which when a length direction-end of the graphite sheet is pulled with a force of 1.5 N/cm in a direction of a tangent to a cross-sectional circle of the roll in a state where the rod-shaped body is fixed, a distance that the end moves in the pulling direction is 0 mm or more but 5 mm or less.

It is preferred that a width direction-maximum height difference of surface of the graphite sheet in a region extending 10 mm or less from a side edge of outer surface of the rolled graphite sheet in a width direction of the rolled graphite sheet is 0 mm or more but 3 mm or less.

It is preferred that the graphite sheet has a density of 1.2 g/cm$^3$ or more.

It is preferred that the rolled graphite sheet further includes a protective film laminated on a front surface and/or a back surface of the graphite sheet in at least one or both of side edge regions of the graphite sheet.

It is preferred that the protective film is disposed so as to protrude outward from the side edges of the graphite sheet.

It is preferred that the protective film has adhesiveness and is capable of be peeling off from the graphite sheet.

It is preferred that a maximum height difference of edge of the graphite sheet in one of roll end faces of the rolled graphite sheet is 0% or more but 2.5% or less of a width of the graphite sheet.

It is preferred that a maximum height difference of edge of the graphite sheet in each of both roll end faces of the rolled graphite sheet is 0% or more but 2.5% or less of a width of the graphite sheet.

It is preferred that an outer surface of the rolled graphite sheet is covered with a heat-shrinkable film.

It is preferred that an outer surface of and roll end faces of the rolled graphite sheet are covered with a heat-shrinkable film, the rod-shaped body protrudes outward from the roll end faces of the rolled graphite sheet, a surface of the rod-shaped body protruding outward is not covered with the heat-shrinkable film, and a value determined by subtracting a maximum height difference of edge of the graphite sheet in the roll end faces of the rolled graphite sheet measured before Test B from that measured after Test B is 10% or less of a width of the graphite sheet.

Test B: The rolled graphite sheet is subjected to vibrations with an amplitude of 50 cm and a frequency of 50 reciprocations/min for 10 minutes in each of x, y, and z directions in a state where the rod-shaped body is kept horizontal, in which the x direction is a length direction of the rod-shaped body, the y direction is a direction horizontally perpendicular to the length direction, and the z direction is a vertical direction.

It is preferred that the heat-shrinkable film is a uniaxially-stretched film.

It is preferred that a number of defects that periodically occur in the length direction of the graphite sheet is 25/m$^2$ or less.

It is preferred that the graphite sheet includes two or more short graphite sheets connected together with a transparent adhesive tape in the length direction, in which in a portion where two short graphite sheets are connected together with the adhesive tape, the two short graphite sheets are disposed with a gap such that a maximum distance between the two short graphite sheets in the length direction of the graphite sheet is 0.3 mm or more but 3 mm or less.

According to one or more embodiments of the present invention, it is possible to provide a rolled graphite sheet in which a sheet shift, that is, unevenness of its roll end faces is less likely to increase even when it is vertically or obliquely disposed or subjected to vibrations.

BRIEF DESCRIPTION OF DRAWINGS

FIGS. 1(A), 1(B), and 1(C) are conceptual diagrams for explaining the rolled graphite sheet of one or more embodiments.

FIG. 2 is a partially-enlarged view of a cross section perpendicular to the width direction of the rolled graphite sheet (cross section taken along a line A-A' shown in FIG. 1) of one or more embodiments.

FIG. 3 is a partially-enlarged view of a cross section parallel to the width direction of the rolled graphite sheet (cross section taken along a line B-B' shown in FIG. 1) of one or more embodiments.

FIG. 4 is a plan view of the rolled graphite sheet of one or more embodiments for explaining the elevation of outer surface of the roll in near-roll edge regions.

FIG. 5 is a perspective view of the rolled graphite sheet of one or more embodiments in which a protective film is laminated on the graphite sheet across the entire width of the graphite sheet.

FIG. 6 is a perspective view of the rolled graphite sheet of one or more embodiments in which protective films are laminated on the graphite sheet in both side edge regions of the graphite sheet.

FIG. 7 is a diagram showing one or more embodiments in which the roll outer surface of and the roll end faces of the rolled graphite sheet are covered with a heat-shrinkable film.

FIG. 8 is a diagram showing one or more embodiments in which two short graphite sheet pieces are connected together with an adhesive tape.

FIG. 9 is a conceptual diagram showing a specific structure of one or more embodiments for rewinding operation.

FIG. 10 is a diagram showing one or more embodiments in which the rolled graphite sheet is hanged in midair.

DETAILED DESCRIPTION OF THE EMBODIMENTS

One or more embodiments of the present invention will be described in detail below.

One or more embodiments of the present invention relate to a rolled graphite sheet. FIG. 1 is a conceptual diagram for explaining a rolled graphite sheet, in which FIG. 1(A) is a perspective view, FIG. 1(B) is a plan view viewed from the side of a rod-shaped body, and FIG. 1(C) is a plan view viewed from the bottom surface side of the rod-shaped body or from a roll end face 13 side. In a rolled graphite sheet 10 according to one or more embodiments of the present invention, a long graphite sheet 12 is wound into a roll around a rod-shaped body 11 as a core member. The number of turns is 2 or more, preferably 5 or more, more preferably 10 or more, in which case advantageous effects of one or more embodiments of the present invention can be more satisfactorily produced. The specific cross-sectional shape of the roll is not particularly limited, and examples thereof include a perfect circular shape and an elliptical shape. The cross-sectional shape of the roll depends on the cross-sectional shape of the rod-shaped body. FIG. 1 shows a case where the roll and the rod-shaped body have a perfect circular cross-section.

(Rod-Shaped Body)

In one or more embodiments, the length of the rod-shaped body is preferably longer than the width of the graphite sheet. In this case, as shown in FIG. 1, the both ends of the rod-shaped body protrude outward from the roll end faces 13 of the rolled graphite sheet. By holding the protruding both ends of the rod-shaped body, it is possible to store or carry the rolled graphite sheet without direct contact with the rolled graphite sheet. The length of each of the protruding portions of the rod-shaped body can be appropriately determined in consideration of the convenience for holding.

In one or more embodiments, the cross-sectional shape of the rod-shaped body is not particularly limited, and examples thereof include a perfect circular shape and an elliptical shape. When the rod-shaped body has a perfect circular cross-section, the diameter thereof is not particularly limited, and is, for example, preferably 1 mm or more but 1000 mm or less, more preferably 5 mm or more but 500 mm or less, even more preferably 25 mm or more but 260 mm or less, most preferably 75 mm or more but 200 mm or less. When the rod-shaped body is thicker, its strength is higher. Therefore, when the graphite sheet is longer, the rod-shaped body is preferably thicker. On the other hand, when the rod-shaped body is thinner, its weight is lighter, and the rolled graphite sheet is thinner when the length of the graphite sheet is the same, which is advantageous for transportation.

The rod-shaped body may be either a hollow member or a solid member. The material of the rod-shaped body is not particularly limited, and rod-shaped bodies made of paper, resin, or metal may be appropriately used.

(Graphite Sheet)

In one or more embodiments, the graphite sheet is a substantially-rectangular belt-shaped sheet that is longer in its length direction than in s width direction, and has a length of 1 m or more. When the length of the graphite sheet is longer, the number of stacked graphite sheet layers in the roll increases so that a sheet shift in the roll is likely to increase. Therefore, the application of one or more embodiments of the present invention is significant. The lower limit of the length is preferably 3 m or more, more preferably 5 m or more, even more preferably 10 m or more, particularly preferably 30 m or more. The upper limit of the length is not particularly limited, but if the length is too long, cracking is likely to occur at the side edges of the graphite sheet when the rolled graphite sheet according to one or more embodiments of the present invention is produced. For this reason, the upper limit of the length is preferably 600 m or less, more preferably 400 m or less, even more preferably 200 m or less, particularly preferably 100 m or less.

The width of the graphite sheet of one or more embodiments is not particularly limited, but is, for example, preferably 5 mm or more but 4000 mm or less, more preferably 50 mm or more but 1000 mm or less. The width of the graphite sheet is even more preferably 100 mm or more but 500 mm or less, most preferably 150 mm or more but 300 mm or less. The graphite sheet having a larger width is preferred from the viewpoint of its wider range of applications, but tends to be difficult to handle because slaws or wrinkles are more likely to occur. The width of the graphite sheet may be constant or vat)/along the length direction. When the width of the graphite sheet varies, the range of variation is preferably small because a processable area is reduced or a width detector is required.

The thickness of the graphite sheet of one or more embodiments is not particularly limited, but is, for example, preferably 0.1 μm or more but 1000 μm or less, more preferably 1 μm or more but 500 μm or less. The thickness of the graphite sheet is even more preferably 3 μm or more but 200 μm or less, most preferably 5 μm or more but 100 μm or less. From the viewpoint of reducing weight and saving space, the graphite sheet preferably has a smaller thickness. On the other hand, from the viewpoint of increasing the amount of heat to be transferred, the graphite sheet preferably has a larger thickness.

The density of the graphite sheet of one or more embodiments is not particularly limited. When, however, the graphite sheet has a high density, the rolled graphite sheet is heavy in weight, in which case sheet shifting is likely to occur due to directional changes or vibrations. Therefore, the application of one or more embodiments of the present invention is more significant when the graphite sheet has a higher density. From this viewpoint, the density of the graphite sheet is preferably 1.2 g/cm$^3$ or more. The density of the graphite sheet is more preferably 1.2 g/cm$^3$ or more but 2.3 g/cm$^3$ or less, even more preferably 1.5 g/cm$^3$ or more but 2.2 g/cm$^3$ or less, particularly preferably 1.7 g/cm$^3$ or more but 2.1 g/cm$^3$ or less.

The sag of the graphite sheet of one or more embodiments is not particularly limited. If, however, the graphite sheet has a large sag, gaps are likely to be created between sheet layers, in which case sheet shilling is likely to occur. The sag of the graphite sheet according to one or more embodiments of the present invention refers to the "sag" of the sheet in the width direction which can be measured by sheet windability evaluation described in JIS C2151. When the sag of the graphite sheet is −20 mm or more but −1 mm or less or 1 mm or more but 80 mm or less, sheet shifting is likely to occur in the rolled graphite sheet due to directional changes or vibrations. Therefore, the application of one or more embodiments of the present invention is significant. When the sag of the graphite sheet is −3 mm or less or 3 mm or more, sheet shifting is more likely to occur, and when the sag of the graphite sheet is −5 mm or less or 5 mm or more, sheet shifting is even more likely to occur. When the sag of the graphite sheet is −20 mm or more, there is an advantage that stress is less likely to concentrate on the side edges of the graphite sheet, and therefore the graphite sheet is less likely to tear. When the sag of the graphite sheet is 80 mm or less, there is an advantage that wrinkles are less likely to occur when the graphite sheet is wound into a roll. An example of a graphite sheet having such a sag value includes one produced by heat-treating a polymer film which will be described later. On the other hand, it has been found by measurement that a graphite sheet produced from natural graphite has a sag of 0 mm, that is, has no sag.

The kinetic coefficient of friction of the graphite sheet of one or more embodiments is not particularly limited. When, however, the kinetic coefficient of friction is lower, slippage is more likely to occur between two graphite sheet layers in contact with each other, in which case sheet shifting is likely to occur. More specifically, when the graphite sheet has a kinetic coefficient of friction of 0.2 or less, sheet shifting is likely to occur, and therefore the application of one or more embodiments of the present invention is significant. Further, when the kinetic coefficient of friction is 0.18 or less, or 0.15 or less, particularly 0.13 or less, sheet shifting is more likely to occur. An example of a graphite sheet having such a kinetic coefficient of friction includes one produced by heat-treating a polymer film which will be described later. On the other hand, it has been found by measurement that a graphite sheet produced from natural graphite has a kinetic coefficient of friction as high as 0.219, and is therefore less likely to cause slippage.

It is to be noted that in one or more embodiments of the present invention, the kinetic coefficient of friction is measured in accordance with ASTM D1894 using a surface measuring instrument HEIDON14DR manufactured by Shinto Scientific Co., Ltd. More specifically, graphite sheets to be measured are brought into contact with each other, a load at the time when the graphite sheet as a sliding piece is slidably pulled is read by a load cell, and the load is divided by a weight load applied to the contact surface between the objects to be measured to determine a kinetic coefficient of friction. A 250×130 mm graphite sheet was prepared as a floor material, and a 63.5×100 mm graphite sheet was prepared as a sliding piece. Both the graphite sheets were set so that the area of contact was 63.5 mm$^2$. The friction test is performed under conditions of a weight of 200 g, a moving speed of 150 min/min, and a moving distance of 80 mm. The sliding piece is reciprocated 5 times, and a numerically-stable value is adopted. Three samples were measured for one level, and the average of measured values is defined as the kinetic coefficient of friction.

The long graphite sheet used in one or more embodiments of the present invention can be produced by heart-treating a polymer film. Examples of a polymer constituting the polymer film suitable for production of the graphite sheet include polyimide, polyamide, polyoxadiazole, polybenzothiazole, polybenzobisthiazole, polybenzoxazole, polybenzobisomizole, polyparaphenylenevinylene, polybenzoimidazole, polybenzobisimidazole, and polythiazole. Particularly, the polymer film is preferably a polyimide film.

In order to obtain a graphite sheet from a polymer film, in one or more embodiments a carbonization process and a graphitization process are performed. The carbonization process and the graphitization process may be either continuously or discontinuously performed. In the carbonization process, a polymer film as a starting material is carbonized by preheating under a reduced pressure or in an inert gas. This carbonization is usually performed at a temperature of about 1000° C. Subsequent to the carbonization process, the graphitization process is performed under a reduced pressure or in an inert gas, and examples of the inert gas include argon and helium. The temperature of heat treatment for graphitization in a method for producing the graphite sheet used in one or more embodiments of the present invention is at least 2400° C. or higher, preferably 2600° C. or higher, more preferably 2800° C. or higher, particularly preferably 2900° C. or higher.

The graphite sheet constituting the rolled graphite sheet according to one or more embodiments of the present invention is preferably one continuous graphite sheet, but may include two or more graphite sheet pieces connected together in the length direction.

In one or more embodiments the length of each of the graphite sheet pieces is preferably 100 mm or more but 600000 mm or less, more preferably 200 mm or more but 500000 mm or less, even more preferably 500 mm or more but 300000 mm or less, most preferably 1000 mm or more but 100000 mm or less. When the graphite sheet piece is longer, the number of connecting portions is smaller. The connecting portion reduces the ability of graphite to transfer heat, and therefore the usable area of the graphite sheet is reduced. On the other hand, when the graphite sheet piece is shorter, there is an advantage that the distortion of the graphite sheet can be reduced by the connecting portions.

(Fixation of Graphite Sheet)

In the rolled graphite sheet according to one or more embodiments of the present invention, the length direction-end of the graphite sheet located on the innermost side of the roll (hereinafter also referred to as inner end) is preferably fixed to the rod-shaped body as a core member. The inner end of the graphite sheet can be fixed to the rod-shaped body by, for example, attaching an adhesive tape or applying an adhesive.

Further, in one or more embodiments the length direction-end of the graphite sheet located on the outermost side of the roll (hereinafter also referred to as outer end) is preferably fixed to prevent the rolled graphite sheet from unwinding. The outer end of the graphite sheet can be fixed to the surface of a graphite sheet layer that is one layer below the outermost graphite sheet layer or the rod-shaped body by, for example, attaching an adhesive tape or applying an adhesive.

(Holding of Rolled Graphite Sheet)

FIG. 10 is a diagram showing the rolled graphite sheet according to one or more embodiments of the present invention hanged in midair, which is viewed from a horizontal direction. Support members 14 are attached to the both ends of the rod-shaped body 11 protruding from the roll end faces 13 of the rolled graphite sheet 10. Each of the support members 14 has a size such that it protrudes at least downward from the roll outer surface of the rolled graphite sheet, and has a strength such that it can support the weight of the rolled graphite sheet. When supported by the support members 14, the rolled graphite sheet according to one or more embodiments of the present invention can be held in a horizontal direction, that is, in a direction such that the rod-shaped body is horizontally directed without bringing the graphite sheet into contact with the ground.

The rolled graphite sheet is usually held in such a horizontal position. However, the rolled graphite sheet is not always held in a horizontal position at the time of transportation, and there is a case where the rolled graphite sheet is disposed in a vertical or oblique position. An increase in sheet shift may occur not only when the rolled graphite sheet is subjected to vibrations but also when the direction of the roll is changed so that the rolled graphite sheet is disposed in a vertical or oblique position.

(Moving Distance of Outer End)

The rolled graphite sheet according to one or more embodiments of the present invention is characterized in that when the outer end of the graphite sheet is pulled with a force of 1.5 N/cm in the direction of a tangent to the cross-sectional circle of the roll in a state where the rod-shaped body is fixed, a distance that the outer end moves in the pulling direction is 0 mm or more but 5 mm or less.

In one or more embodiments, when the outer end of the graphite sheet is pulled in a state where the rod-shaped body is fixed, there is a case where the outer end moves depending on the winding strength of the rolled graphite sheet. That is, when the winding strength is weak, the outer end greatly moves, and when the winding strength is sufficiently strong, the outer end hardly moves. The rolled graphite sheet according to one or more embodiments of the present invention is characterized in that when the outer end of the graphite sheet is pulled in a state where the rod-shaped body is fixed, the moving distance of the outer end is small, that is, the outer end of the graphite sheet is less likely to move in the length direction. The rolled graphite sheet according to one or more embodiments of the present invention is formed by winding the graphite sheet with a high tension so that the moving distance of the outer end at the time when the outer end of the graphite sheet is pulled with a predetermined force is 5 mm or less, and is therefore less likely to cause sheet shilling due to directional changes or vibrations. In one or more embodiments of the present invention, the moving distance is preferably as small as possible, and is preferably 0 to 4.0 mm, more preferably 0 to 3.0 mm, even more preferably 0 to 2.0 mm, most preferably 0 to 1.0 mm.

FIG. 2 is a partially-enlarged view of a cross-section perpendicular to the width direction of the graphite sheet (cross-section taken along a line A-A' shown in FIG. 1) for explaining the direction of a tangent to the cross-sectional circle of the roll. The tangential direction is denoted by reference numeral 22, and refers to the direction of a tangent to the cross-sectional circle, which is a cross-sectional shape of the roll, drawn from the outer end 21 of the graphite sheet at the time when the rolled graphite sheet is viewed from its cross-sectional direction. In one or more embodiments of the present invention, the moving distance is defined as a distance that the outer end moves when pulled with a force of 1.5 N/cm in such a tangential direction. The pulling force of 1.5N/cm means that a force exerted per cm of width of the graphite sheet is 1.5 N. More specifically, when the graphite sheet has a width of 20 cm, a pulling force of 30 N is exerted on the graphite sheet when the graphite sheet is pulled.

(Maximum Height Difference After Test A)

In the rolled graphite sheet according to one or more embodiments of the present invention, the maximum height difference of edge of the graphite sheet in the roll end faces measured after Test A that will be described later is preferably 2.5% or less of the width of the graphite sheet.

Test A: The rolled graphite sheet is held for 30 seconds in a direction such that the length direction of the rod-shaped body is vertically directed.

The rolled graphite sheet according to one or more embodiments of the present invention is usually held in a direction such that the rod-shaped body is horizontally directed, but is not always kept in a horizontal position at the time of transportation. Test A simulates a positional change at the time of transportation. The above-described property means that a sheet shift in the width direction of the graphite sheet is less likely to increase even when the rod-shaped body is vertically directed. The rolled graphite sheet according to one or more embodiments of the present invention is formed by winding the graphite sheet with a high tension so that a width-direction shift (maximum height difference) caused by Test A is 2.5% or less of the width of the graphite sheet, and is therefore less likely to cause sheet shifting due to directional changes or vibrations. The shift is preferably as small as possible. More specifically, the shift is preferably 2% or less, more preferably 1.5% or less, even more preferably 1.0% or less, even more preferably 0.5% or less, particularly preferably 0.3% or less.

Further, the present inventors have found that in one or more embodiments when a rolled graphite sheet whose width-direction shift after Test A is large and another long film (e.g., an adhesive tape) having the same width as the rolled graphite sheet are bonded together by a roll-to-roll system, the side edge of the graphite sheet largely protrudes beyond the side edge of the another film so that the usable area of the laminated film is reduced. Also from this viewpoint, as described above, the rolled graphite film is preferably formed so that a width-direction shift caused by Test A is small.

FIG. 3 is a partially-enlarged view of a cross-section parallel to the width direction of the rolled graphite sheet (cross-section taken along a line B-B' shown in FIG. 1) for explaining a maximum height difference 32 among width-direction edge 31 of sheet layers of the graphite sheet in the roll end face 13. The rolled graphite sheet according to one or more embodiments of the present invention is formed by winding the graphite sheet multiple times, and therefore the width-direction edges 31 of sheet layers of the graphite sheet are stacked at the roll end face. When these stacked edges are uneven (misaligned), such unevenness is called height difference, and the maximum value thereof is called maximum height difference of edge. When there is no height difference among the width-direction edges, the maximum height difference is zero. It is to be noted that the maximum height difference refers to the maximum height difference in both the roll end faces.

When the above-described Test A is performed, gravity acts in the width direction of the graphite sheet, and therefore slippage occurs between sheet layers in the width direction of the graphite sheet so that the maximum height difference among the width direction-edges is likely to increase. The rolled graphite sheet according to one or more embodiments of the present invention is formed in such a manner that the maximum height difference after Test A is as small as possible, more specifically the maximum height difference after Test A is 2.5% or less of the width of the graphite sheet.

(Maximum Height Difference Before Test A)

As described above, the width-direction shift (maximum height difference after Test A is 2.5% or less of the width. However, in the rolled graphite sheet according to one or more embodiments of the present invention, the maximum height difference 32 among the width-direction edges 31 of sheet layers of the graphite sheet shown in FIG. 3 may or may not be 0 before performing Test A. The inherent maximum height difference of the rolled graphite sheet measured in one of the roll end faces may be 0, but is preferably 0% or more but 2.5% or less of the width of the graphite sheet. When the maximum height difference is within the above range, the graphite sheet is less likely to meander when the rolled graphite sheet according to one or more embodiments of the present invention is rewound into another roll, which is advantage in that the graphite sheet can be stably bonded to another long film by a roll-to-roll system. Further, there is also an advantage that flaws are less likely to occur at the side edges of the sheet when the rolled graphite sheet according to one or more embodiments of the present invention is handled.

In addition to the above, in one or more embodiments the maximum height difference among the width-direction edges of sheet layers of the graphite sheet in the other roll end face may be 0, but is more preferably 0% or more but 2.5% or less of the width of the graphite sheet. That is, it is more preferred that the maximum height difference among the width-direction edges of sheet layers of the graphite sheet in each of both the roll end faces is 0% or more but 2.5% or less. In this case, the above-described advantages are more efficiently achieved.

Such a height difference among the width-direction edges can be adjusted by controlling winding conditions during winding of the graphite sheet around the rod-shaped body. Further, the height difference among the width-direction edges can be adjusted also by winding the graphite sheet Whose width varies within a certain range around the rod-shaped body.

(Rolled Graphite Sheet Production Method)

The rolled graphite sheet according to one or more embodiments of the present invention can be produced by winding a long graphite sheet around a rod-shaped body with a high tension. The tension at this time is preferably 0.5 N/cm or more, more preferably 0.8 N/cm or more, even more preferably 1.0 N/cm or more, particularly preferably 1.5 N/cm or more. The unit of tension, N/cm means tension (unit: N) applied per cm of width of the graphite sheet. For example, when a tension of 16 N is applied to the graphite sheet having a width of 20 cm, the tension at this time is expressed as 0.8 N/cm. When the tension at the time of winding is higher, the moving distance of the outer end of the graphite sheet at the time when the outer end is pulled is smaller, or the maximum height difference among the width-direction edges after Test A is smaller.

The upper limit of the tension is not particularly limited, but if the tension is too high, there is a possibility that the graphite sheet tears during winding. From the viewpoint of avoiding this, the upper limit of the tension is preferably 15 N/cm or less, more preferably 10 N/cm or less, even more preferably 5 N/cm or less. Further, from the viewpoint of preventing the occurrence of periodic flaws that will be described later, the upper limit of the tension is preferably 2.5 N/cm or less, more preferably 2.0 N/cm or less.

According to a specific example of the production method, the rolled graphite sheet according to one or more embodiments of the present invention can be produced by rewinding a long graphite sheet wound around a certain rod-shaped body around another rod-shaped body with a high tension.

FIG. 9 is a conceptual diagram showing a specific structure for rewinding operation. The graphite sheet 12 is continuously unwound from a rolled graphite sheet 91 for unwinding, conveyed in the direction of an arrow, and wound around the wind-up rod-shaped body 11. In this way, the rolled graphite sheet according to one or more embodiments of the present invention is formed. On the pass line of the graphite sheet, a near roll 92 is provided in the vicinity of the wind-up rod-shaped body 11 to prevent air entrainment. A touch roll may be used instead of the near roll so as not to scratch the surface of the graphite sheet. Between the rolled graphite sheet 91 for unwinding and the near roll 92, a tension detector 93 is provided to detect tension applied to the graphite sheet during winding. The tension applied to the graphite sheet during winding operation can be controlled to be a specific value by adjusting the unwinding speed of the rolled graphite sheet 91 for unwinding during winding based on detected tension.

In one or more embodiments, the unwinding speed and/or the winding speed are/is preferably 0.5 m/min or more but 100 m/min or less, more preferably 1 m/min or more but 50 m/min or less, even more preferably 5 m/min or more but 25 m/min or less. From the viewpoint of reducing losses caused before the stop of operation at the time when trouble occurs, the unwinding speed and/or winding speed are/is preferably lower. On the other hand, from the viewpoint of reducing processing time, the unwinding speed and/or wincing speed are/is preferably higher.

Further, in one or more embodiments the height difference among the width-direction edges of sheet layers of the graphite sheet in the roll end face shown in FIG. 3 can be reduced during rewinding by providing EPC (edge position control) or CPC (center position control) as an automatic meander correcting device on the pass line of the graphite sheet.

Further, in one or more embodiments when the graphite sheet whose width varies within a certain range is rewound using EPC, the maximum height difference among the width-direction edges in one of the roll end faces can be made substantially 0. On the other hand, the other roll end face has considerable unevenness, and therefore the maximum height difference among the width-direction edges can be made a considerable value.

In one or more embodiments, the graphite sheet may be slightly meandered during rewinding. Particularly, winding performed by controlling the direction of meandering in such a manner that the graphite sheet is oscillated within a certain width is called oscillation winding. In this case, the graphite sheet is preferably oscillated so that the maximum height difference among the width-direction edges of sheet layers of the graphite sheet is 0% or more but 2.5% or less of the width of the graphite sheet, and rewinding is performed in such a manner that a width direction-shift of the graphite sheet per meter of length of the graphite sheet is 0.01 mm or more but 100 mm or less, preferably 0.1 mm or more but 10 mm or less, more preferably 0.5 mm or more but 1 mm or less. This is preferred in that the above-described advantages can be obtained and that when the graphite sheet has thickness variations (thickness variations observed in the width direction of the graphite sheet), the thickness variations are distributed in the width direction when the sheet layers of the graphite sheet are stacked in the rolled graphite sheet.

(Elevation in Roll Edge Regions)

In one or more embodiments the graphite sheet has a slightly larger thickness at its width-direction edges than at its width-direction center. When such a graphite sheet is wound into a roll, the thicker portions are stacked in multiple layers. In this case, when the outer surface of the roll is viewed, elevations may be observed in the near-roll edge regions of the outer surface of the roll as shown in FIG. 4. Particularly, when the graphite sheet is longer, the height of such elevations 41 tends to increase. If the height of the elevations 41 excessively increase, a relatively great force is exerted on the sheet edges when an impact is given to the graphite sheet at the time of, for example, production or transportation of the rolled graphite sheet so that cracking tends to easily occur at the sheet edges.

For this reason, when the outer surface of the rolled graphite sheet according to one or more embodiments of the present invention is observed, a maximum height difference 43 of the roll outer surface measured in each near-edge region 42 in the width direction, that is, the height of the elevation 41 is preferably 0 mm or more but 3 mm or less. When the maximum height difference is within the above range, the occurrence of cracking at the sheet edges can be prevented. It is to be noted that the maximum height difference of the roll outer surface is also referred to as a raised edge.

As shown in FIG. 4, the near-edge region 42 refers to a region extending 10 mm or less from the roll end face in the width direction. In this region, the maximum height difference 43 of the roll outer surface is measured. The maximum height difference is preferably 0 mm or more but 3.0 mm or less, more preferably 0 mm or more but 2.0 mm or less, even more preferably 0 mm or more but 1.0 mm or less, particularly preferably 0 mm or more but 0.5 mm or less.

Examples of a method for producing the rolled graphite sheet having such a maximum height difference of the roll outer surface include a method in which the length of the graphite sheet is set so as not to be excessively large and a method in which the graphite sheet is produced in such a manner that its width-direction edges and width-direction center have a uniform thickness.

(Periodic Flaws)

As described above, the rolled graphite sheet according to one or more embodiments of the present invention is produced by winding the graphite sheet with a high tension. Therefore, if the graphite sheet has even one convex defect, the convex defect is transferred to an adjacent sheet layer of the rolled graphite sheet so that defects tend to periodically appear in the length direction. Such periodic detects are convex defects that are caused by a convex defect having a height of 300 μm or more and that appear almost regularly at intervals of the circumferential length of the rolled graphite sheet.

From the above viewpoint, it is preferred that the tension during winding is not excessively high. More specifically, the tension during winding is preferably 2.5 N/cm or less, more preferably 2.0 N/cm or less. By setting the tension during winding to a value within the above range, it is possible to reduce the number of defects that periodically appear in the length direction.

In the rolled graphite sheet according to one or more embodiments of the present invention, the number of defects that periodically appear in the length direction is preferably 25 per $m^2$ of the graphite sheet or less, that is, 25/$m^2$ or less, more preferably 20/$m^2$ or less, even more preferably 15/$m^2$ or less, particularly preferably 10/$m^2$ or less. If the graphite sheet has defects, the area of the graphite sheet that can be used for a predetermined purpose is reduced. When the number of periodic defects is 25/$m^2$ or less, a wide region of the graphite sheet can be used.

It is to be noted that periodic defects can be identified by observing the surface of the graphite sheet unwound from the rolled graphite sheet. At this time, a micrometer can be used.

(Connected Graphite Sheet)

The long graphite sheet used for the rolled graphite sheet according to one or more embodiments of the present invention may be a continuous graphite sheet, but may be a graphite sheet formed by connecting two or more graphite sheet pieces together in the length direction. For example, two 50 m-long graphite sheet pieces having the same width may be connected together to form a 100 m-long connected graphite sheet.

When two graphite sheet pieces are connected together, a transparent adhesive tape is preferably used. At this time, the two graphite sheet pieces do not overlap one another in a portion where they are connected together with an adhesive tape, that is, the two graphite sheet pieces are placed with a gap being provided therebetween and connected together by bridging the gap with an adhesive tape. FIG. 8 is a diagram showing a state where two short graphite sheet pieces 12a and 12b, which are placed with a gap 82 being provided therebetween, are connected together with a transparent adhesive tape 81.

In one or more embodiments, the gap is preferably one whose maximum distance 83 measured in the length direction of the graphite sheet is 0.3 mm or more. The maximum distance refers to the width of the gap when the gap has a constant width in the length direction, and refers to the maximum width of the gap when the gap has a non-constant width in the length direction. When the two graphite sheet pieces are connected together with a transparent adhesive tape in a state where a gap having such a size as described above is provided therebetween, light can pass through the gap when the connecting portion is irradiated with light. On the other hand, since the graphite sheet is not transparent, light does not pass through the graphite sheet other than the connecting portion. As a result, the connecting portion can be easily identified using an optical sensor when, for example, the rolled graphite sheet according to one or more embodiments of the present invention is rewound into another roll.

In one or more embodiments if the gap is too large, there is a case where the adhesive surface of the adhesive tape adheres to the surface of a graphite sheet layer located one layer inside the gap in the rolled graphite sheet. In this case, there is a fear that the surface of the graphite sheet comes off when the rolled graphite sheet is unwound so that a defect occurs. From this viewpoint, the maximum distance of the gap is preferably 3.0 mm or less, more preferably 2.0 mm or less, even more preferably 1.0 mm or less, particularly preferably 0.8 mm or less.

Further, if the thickness of the adhesive tape is too large, a bump is formed by the adhesive tape. If this bump is transferred to an adjacent sheet layer of the rolled graphite sheet, there is a fear that periodic defects appear. From this viewpoint, the thickness of the adhesive tape is preferably small. More specifically, the thickness of the adhesive tape is preferably 100 µm or less, more preferably 80 µm or less, even more preferably 60 µm or less. However, if the adhesive tape is too thin, there is a fear that the workability of connection work is reduced. For this reason, the thickness of the adhesive tape is preferably 10 µm or more, more preferably 20 µm or more, even more preferably 30 µm or more.

(Protective Film)

The rolled graphite sheet according to one or more embodiments of the present invention may be one obtained by winding only the graphite sheet into a roll, but may be one obtained by winding a laminate of the graphite sheet and a long protective film into a roll. The protective film has a length and a width, and the length is preferably the same as that of the graphite sheet. FIG. 5 is a diagram showing a state where a protective film 51 having the same width as the graphite sheet 12 is laminated on the front surface of the graphite sheet 12 across the full width of the graphite sheet 12. FIG. 6 is a diagram showing a state where protective films 51a and 51b having a smaller width than the graphite sheet 12 are laminated on the front surface of the graphite sheet 12 in both side edge regions of the graphite sheet 12, respectively.

As shown in FIGS. 5 and 6, the protective film may be laminated on only the front surface of the graphite sheet (which is located on the outside when the graphite sheet is wound into a roll), or may be laminated on only the back surface of the graphite sheet (which is located on the inside when the graphite sheet is wound into a roll), or may be laminated on both surfaces of the graphite sheet.

Further, the protective film of one or more embodiments may be laminated across the full width of the front surface and/or back surface of the graphite sheet, or may be laminated on part of the surface in the width direction. From the viewpoint of protecting the side edges of the graphite sheet from an impact or the like at the time of transportation, the protective film is preferably laminated in at least the side edge regions of the graphite sheet. This makes it possible to prevent the occurrence of cracking at the side edges of the sheet at the time of production or transportation. Further, since the protective film functions as a cushion, the above-described height difference of the roll outer surface in the near-edge regions can be reduced.

In one or more embodiments, when the protective film is laminated only in the side edge regions of the graphite sheet, as shown in FIG. 6, the protective film is preferably symmetrically laminated in both the side edge regions of the graphite sheet. In this case, the width of the protective film is preferably 1 mm or more but 50 mm or less, more preferably 5 mm or more but 30 mm or less.

Further, the protective film may be laminated on the graphite sheet in such a manner that the side edges (width-direction side edges) of the protective film align with the side edges (width-direction side edges) of the graphite sheet. However, the protective film is preferably laminated on the graphite sheet in such a manner that the side edges of the protective film protrude toward the outside of the roll from the side edges of the graphite sheet, in which case the side edges of the graphite sheet can be efficiently protected from an impact or the like at the time of transportation. In this case, the width of the protruding portion is preferably 1 mm or more but 50 mm or less, more preferably 5 mm or more but 30 mm or less.

A material that can be used for the protective film is not particularly limited, and examples thereof include polyolefins such as polyethylene and polypropylene and polyesters such as polyethylene terephthalate, and polyvinyl chloride.

It is preferred that there is friction between the protective film and the graphite sheet so that slippage does not occur between them. From this viewpoint, the protective film preferably has adhesiveness. In this case, the graphite sheet and the protective film are integrated, and therefore the protective film is also expected to have the effect of reinforcing the graphite sheet. Further, the protective film having adhesiveness is preferably peelable from the graphite sheet. In this case, the protective film can be peeled off from the graphite sheet to use only the graphite sheet for a predetermined purpose.

However, the protective film may be a film having no adhesiveness. In this case, the protective film and the graphite sheet may be bonded together with an adhesive or the like separately prepared, or may not be bonded together.

The rolled graphite sheet according to one or more embodiments of the present invention in which the long protective film is laminated on the long graphite sheet can be produced by winding a laminate of the long graphite sheet and the long protective film with a high tension around the rod-shaped body.

(Heat-Shrinkable Film)

The roll outer surface of and the roll end faces of the rolled graphite sheet according to one or more embodiments of the present invention are preferably covered with a heat-shrinkable film. This makes it possible to more effectively prevent the occurrence of sheet shifting due to directional changes or vibrations. Further, it is also possible to protect the roll outer surface and the roll end faces. FIG. 7 is a diagram showing a state where the roll outer surface of and the roll end faces of the rolled graphite sheet according to one or more embodiments of the present invention are covered with a heat-shrinkable film 71.

In such embodiments, the surface of the rod-shaped body protruding toward the outside of the roll from the roll end faces may be covered with the heat-shrinkable film, but is preferably not covered. This is because if the surface of the rod-shaped body is also covered with the heat-shrinkable film, a gap is likely to be created between the roll end faces and the heat-shrinkable film, in which case the roll end faces are not tightly covered with the heat-shrinkable film, and therefore the effect of preventing sheet shifting is less likely to be sufficiently exhibited.

As described above, in one or more embodiments when the roll outer surface and the roll end faces are covered with the heat-shrinkable film, sheet shifting is much less likely to occur even when the rolled graphite sheet is subjected to vibrations at the time of transportation. Such a physical property of the rolled graphite sheet can be evaluated by the following method.

In one or more embodiments, a value determined by subtracting the maximum height difference of edge of the graphite sheet in the roll end faces of the rolled graphite sheet measured before Test B from that measured after Test B is 10% or less of the width of the graphite sheet. It is to be noted that the maximum height difference of the edge has already been described above with reference to FIG. 3. When the maximum height difference of the edge is measured, the heat-shrinkable film is removed.

Test B: The rolled graphite sheet is subjected to vibrations with an amplitude of 50 cm and a frequency of 50 reciprocations/min for 10 minutes in each of x, y, and z directions in a state where the rod-shaped body is kept horizontal, in which the x direction is a length direction of the rod-shaped body, the y direction is a direction horizontally perpendicular to the length direction, and the z direction is a vertical direction.

The vibrations in Test B are stylized vibrations that may be given to the rolled graphite sheet at the time of transportation. It can be said that when satisfying the above requirement, the rolled graphite sheet is much less likely to cause sheet shifting due to vibrations at the time of transportation. A difference of the width-direction shift (maximum height difference) before and after Test B is preferably as small as possible. More specifically, the value of the width-direction shift (maximum height difference) before and after Test B is preferably 8% or less, more preferably 5% or less, even more preferably 3% or less, particularly preferably 1% or less of the width of the graphite sheet.

The heat-shrinkable film is not particularly limited, and a commercially-available packing film that is generally called "shrink film" can be used. The material thereof is not particularly limited, and examples thereof include polyvinyl chloride, polypropylene, polyethylene, polystyrene, polyolefin, and polyethylene terephthalate.

In one or more embodiments, the heat-shrinkable film is preferably a stretched film. The stretched film may be either a uniaxially stretched film or a biaxially stretched film, but is preferably a uniaxially stretched film stretched in its length direction. The uniaxially stretched film can more effectively protect the roll end faces because the uniaxially stretched film shrinks in its length direction, but is less likely to shrink in its width direction.

In one or more embodiments, a method for coating the rolled graphite sheet with the hat-shrinkable film is not particularly limited, and an example thereof includes a method in which the size of the heat-shrinkable film to be used is determined in consideration of a reduction in size due to heat shrinkage, the heat-shrinkable film is formed into a cylindrical shape to wrap around the rolled graphite sheet, and the heat-shrinkable film is heated at a predetermined temperature to cover the rolled graphite sheet. The temperature and time during heating can be appropriately determined in consideration of the material, thickness, etc. of the heat-shrinkable film to be used. Particularly, a cylindrical shrink film suitably used, and the cylindrical shrink film is preferably stretched in its circumferential direction so that its diameter is reduced by shrinkage, in which case the roll end faces can be more effectively protected.

EXAMPLES

Hereinbelow, one or more embodiments of the present invention will be described in more detail with reference to examples, but the present invention is not limited to these examples.

Examples 1-1 to 1-5 and Comparative Example 1-1

A long graphite sheet (density: 2.0 g/cm$^3$, sag: 7 mm, kinetic coefficient of friction: 0.105) having a width of 200 mm, a length of 30 m, and a thickness of 32 μm was wound around a core member (which was the same as a rod-shaped body that will be described later) with a tension of 10 N to prepare a raw material roll 91. The raw material roll 91 was rewound around a rod-shaped body 11 (manufactured by Showa Marutsutsu Co., Ltd., made of polyethylene, hollow cylindrical shape, inner diameter: 3 inch, thickness: 5.5 mm, width: 250 mm) as a core with a rewinding tension shown in Table 1 with the use of a rewinder shown in FIG. 9, and the outer end of the graphite sheet was fixed with a tape that will be described later to obtain a rolled graphite sheet.

The rewinding tension was controlled in the following manner. An unwinding speed was adjusted by feeding the value of tension measured by a tension pickup (tension detector 93) into a tension controller while the rod-shaped body 11 was rotated at a predetermined speed (10 m/min). In the rewinder shown in FIG. 9, a near roll 92 has an outer diameter of 80 mm, and a gap between the near roll and a wind-up roll was set to 20 mm. EPC (Edge Position Control, automatic meander correction device) was provided on the pass line of the graphite sheet to align the edges of graphite sheet layers on one side of the graphite sheet when rewinding was performed.

Before the rewinding was performed, the inner end of the long graphite sheet was previously fixed to the rod-shaped body with the use of a transparent double-sided tape (N0539R manufactured by Nitoms, Inc., Type J0820). Further, after the rewinding, the outer end of the long graphite sheet was fixed to the surface of the inner sheet layer of the graphite sheet at the center of the width direction with the use of a masking tape for sealing (Scotch 99BB manufactured by 3M).

Various evaluations that will be described below were performed on the obtained rolled graphite sheet. The results are shown in Table 1.

(Moving Distance of End at the Time of Pulling)

The outer end of the rolled graphite sheet was connected to a force gage (DS2-500N manufactured by IMADA CO., LTD.) with the use of an adhesive tape. The outer end was pulled in the direction of a tangent to the cross-sectional circle of the roll until a pull force was increased from 0 N to 30 N (i.e., 1.5 N/cm) while the rod-shaped body was fixed, and then the distance that the outer end was moved by this pulling action was measured.

(Maximum Height Difference of Sheet Edge in Roll End Face (Sheet Shift))

The maximum height difference of edge of the graphite sheet in one of the end faces of the rolled graphite sheet (sheet shift observed in the roll end face) was measured using a CNC video measuring system (NEXIV VMR-3020 manufactured by NIKON CORPORATION). This measurement was performed before and after Test A that will be described below.

(1) The maximum height difference measured before Test A, (2) the ratio of the maximum height difference measured before Test A to the width of the graphite sheet ([maximum height difference before Test A/GS width]), (3) the maximum height difference measured after Test A, and (4) the ratio of the maximum height difference after Test A to the width of the graphite sheet ([maximum height difference after Test A/GS width]) are shown in Table 1.

(Test A)

The roll was allowed to stand vertically so that the length direction of the rod-shaped body was vertically directed, and was kept in such a position for 30 seconds until the movement of the film was stopped.

(Maximum Height Difference of Graphite Sheet Surface (Raised Edge))

The maximum height difference of surface of the graphite sheet in the width direction of the graphite sheet was measured in a region extending 10 mm or less from the roll edge in the width direction of the graphite sheet by placing a caliper on the outer surface of the roll.

(Cracking at Sheet Side Edges)

The rolled graphite sheet was unwound, and the number of cracks at the side edges of the graphite sheet was visually counted, and the number of cracks was expressed as the number of cracks per 100 m of length of the graphite sheet. Here, the cracks were produced at the time when the above-described rewinding was performed, that is, when the rolled graphite sheet according to one or more embodiments of the present invention was produced.

maximum height difference after Test A to GS width slightly increases, but does not significantly change.

TABLE 1

|  | GS width mm | GS length m | Rewinding tension N/cm | Moving distance mm | Maximum height difference before Test A mm | Maximum height difference before Test A/GS width % | Maximum height difference after Test A mm | Maximum height difference after Test A/GS width % | Raised edge mm | Cracking at sheet side edges Number of cracks/100 m |
|---|---|---|---|---|---|---|---|---|---|---|
| Example 1-1 | 200 | 30 | 5.0 | 0 | 0.3 | 0.2% | 0.3 | 0.2% | 0.5 | 2 |
| Example 1-2 | 200 | 30 | 2.5 | 0 | 0.3 | 0.2% | 0.3 | 0.2% | 0.5 | 2 |
| Example 1-3 | 200 | 30 | 1.5 | 0 | 0.2 | 0.1% | 0.2 | 0.1% | 0.5 | 2 |
| Example 1-4 | 200 | 30 | 1.0 | 2 | 0.3 | 0.2% | 3 | 0.2% | 0.5 | 2 |
| Example 1-5 | 200 | 30 | 0.5 | 5 | 0.3 | 0.2% | 5 | 2.5% | 0.5 | 2 |
| Comparative Example 1-1 | 200 | 30 | 0.25 | 30 | 0.3 | 0.2% | 10 | 5.0% | 0.5 | 2 |

As can be seen from Table 1, when the rewinding tension is higher, the moving distance of the outer end at the time of pulling is smaller. Further, it can also be seen that when the rewinding tension is higher, the ratio of maximum height difference after Test A to GS width is lower, that is, a sheet shift due to the directional change of the roll is less likely to increase. In Examples 1-1 to 1-5, the moving distance of the outer end at the time of pulling was 5 mm or less, and the ratio of maximum height difference after Test A to GS width is relatively as small as 2.5% or less, whereas in Comparative Example 1-1, the moving distance is much larger than 5 mm, and as a result, the ratio of maximum height difference after Test A to GS width is as high as 5.0%, that is, a sheet shift is significantly increased due to the directional change of the roll.

Further, it can be seen that the magnitude of the rewinding tension has no influence on the maximum height difference of the surface of the graphite sheet (raised edge) or the number of cracks at the sheet side edges.

Examples 2-1 to 2-7

Rolled graphite sheets were obtained in the same manner as in Example 1-3 except that the length of the long graphite sheet was changed as shown in Table 2. Various evaluations were performed in the same manner as described above, and the results are shown in Table 2.

It can also be seen that as the length of the graphite sheet increases, the maximum height difference of surface of the graphite sheet (raised edge) and the number of cracks at the sheet side edges tend to increase.

Examples 3-1 to 3-7

Rolled graphite sheets were obtained in the same manner as in Example 2-4 except that a long protective film that will be described later was laminated on the long graphite sheet when the long graphite sheet was rewound. When the rewinding was performed, EPC was provided on each of the pass line of the graphite sheet and the pass line of the protective film in the rewinder to adjust the position of side edge of the graphite sheet and the position of side edge of the protective film. It is to be noted that except for Example 3-6, the rewinding was performed in such a manner that the side edge of the graphite sheet was alighted with the side edge of the protective film.

The protective film used in each of Examples 3-1 to 3-7 will be described in detail below.

TABLE 2

|  | GS width mm | GS length m | Rewinding tension N/cm | Moving distance mm | Maximum height difference before Test A mm | Maximum height difference before Test A/GS width % | Maximum height difference after Test A mm | Maximum height difference after Test A/GS width % | Raised edge mm | Cracking at sheet side edges Number of cracks/100 m |
|---|---|---|---|---|---|---|---|---|---|---|
| Example 2-1 | 200 | 1 | 1.5 | 0 | 0.1 | 0.1% | 0.1 | 0.1% | 0 | 0 |
| Example 2-2 | 200 | 3 | 1.5 | 0 | 0.1 | 0.1% | 0.1 | 0.1% | 0 | 0 |
| Example 2-3 | 200 | 10 | 1.5 | 0 | 0.2 | 0.1% | 0.2 | 0.1% | 0 | 0 |
| Example 1-3 | 200 | 30 | 1.5 | 0 | 0.2 | 0.1% | 0.2 | 0.1% | 0.5 | 2 |
| Example 2-4 | 200 | 100 | 1.5 | 0 | 0.5 | 0.3% | 0.6 | 0.3% | 1 | 5 |
| Example 2-5 | 200 | 200 | 1.5 | 0 | 1 | 0.5% | 1.2 | 0.6% | 2 | 50 |
| Example 2-6 | 200 | 400 | 1.5 | 0 | 2 | 1.0% | 2.5 | 1.3% | 3 | 500 |
| Example 2-7 | 200 | 600 | 1.5 | 0 | 2.5 | 1.3% | 3 | 1.5% | 4 | 1000 |

As can be seen from Table 2, the moving distance of the outer end at the time of pulling does not change even when the length of the graphite sheet increases as long as the rewinding tension is appropriate. It can also be seen that as the length of the graphite sheet increases, the ratio of Example 3-1

One sheet of polypropylene film (SUN•TOX OP PA21 manufactured by SUN•TOX CO., LTD., thickness: 50 μm, width: 200 mm) was used to cover the front surface of the graphite sheet across the full width of the graphite sheet.

Example 3-2

One sheet of polypropylene film that was the same as that in Example 3-1 was used to cover the back surface of the graphite sheet across the full width of the graphite sheet.

Example 3-3

Two sheets of polypropylene film that were the same as that in Example 3-1 were used to cover the both surfaces of the graphite sheet across the full width of the graphite sheet.

Example 3-4

Two sheets of polypropylene film that were the same as that used in Example 3-1 except that its width was changed to 10 mm were used to cover the both side edge regions of the graphite sheet.

Example 3-5

One sheet of PET film (5A-F56 manufactured by Toray Industries, Inc., thickness: 4.5 μm, width: 200 mm) was used to cover the front surface of the graphite sheet across the full width of the graphite sheet.

Example 3-6

The graphite sheet was covered with the polypropylene film in the same manner as in Example 3-1 except that the width of the polypropylene film was changed to 220 mm so that each of the side edges of the polypropylene film protruded outward 10 mm from each of the side edges of the graphite sheet.

Example 3-7

One sheet of low adhesive film (CPF50(75)-SL manufactured by NIPPA CORPORATION, thickness: 70 μm, width: 200 mm) was used to cover the front surface of the graphite sheet across the full width of the graphite sheet.

TABLE 3

| | Protective film | | | GS width mm | GS length m | Rewinding tension N/cm | Moving distance mm |
|---|---|---|---|---|---|---|---|
| | Material | Thickness (μm) | Position | | | | |
| Example 2-4 | — | — | Only GS | 200 | 100 | 1.5 | 0 |
| Example 3-1 | PP | 50 | Front surface | 200 | 100 | 1.5 | 0 |
| Example 3-2 | PP | 50 | Back surface | 200 | 100 | 1.5 | 0 |
| Example 3-3 | PP | 50 | Both surfaces | 200 | 100 | 1.5 | 0 |
| Example 3-4 | PP | 50 | Both edge regions | 200 | 100 | 1.5 | 0 |
| Example 3-5 | PET | 4.5 | Front surface | 200 | 100 | 1.5 | 0 |
| Example 3-6 | PP | 50 | Both edge regions, Protruded | 200 | 100 | 1.5 | 0 |
| Example 3-7 | Low adhesive | 70 | Front surface | 200 | 100 | 1.5 | 0 |

| | Maximum height difference before Test A mm | Maximum height difference before Test A/GS width % | Maximum height difference after Test A mm | Maximum height difference after Test A/GS width % | Raised edge mm | Cracking at sheet side edges Number of cracks/100 m |
|---|---|---|---|---|---|---|
| Example 2-4 | 0.5 | 0.3% | 0.5 | 0.3% | 1 | 5 |
| Example 3-1 | 0.5 | 0.3% | 0.5 | 0.3% | 0.5 | 2 |
| Example 3-2 | 0.5 | 0.3% | 0.5 | 0.3% | 0.5 | 2 |
| Example 3-3 | 0.5 | 0.3% | 0.5 | 0.3% | 0.3 | 1 |
| Example 3-4 | 0.5 | 0.3% | 0.5 | 0.3% | 0.5 | 2 |
| Example 3-5 | 0.5 | 0.3% | 0.5 | 0.3% | 0.8 | 4 |
| Example 3-6 | 0.5 | 0.3% | 0.5 | 0.3% | 0.5 | 2 |
| Example 3-7 | 0.5 | 0.3% | 0.5 | 0.3% | 0.2 | 0 |

As can be seen from Table 3, the number of cracks at the sheet side edges can be reduced by providing the protective film without adversely affecting the moving distance of the outer end at the time of pulling and the ratio of maximum height difference after Test A to GS width.

Example 4-1

A rolled graphite sheet was obtained in the same manner as in Example 2-4 except that EPC was not used at the time of rewinding, and the height difference of edge of the graphite sheet in the roll end faces was adjusted to be large. In the thus obtained rolled graphite sheet, the height difference of the sheet edge in each of the roll end faces was large.

Example 4-2

A rolled graphite sheet was obtained in the same manner as in Example 2-4 except that a long graphite sheet whose width varied within the range of 195 to 205 μm was used. In the thus obtained rolled graphite sheet, the height difference of the sheet edge in one of the roll side end faces was almost zero, but that in the other roll end face was as large as that in Example 4-1.

Example 4-3

A rolled graphite sheet was obtained in the same manner as in Example 2-4 except that a long graphite sheet whose width varied within the range of 195 to 205 μm was used and CPC (Center Position Control) was provided instead of EPC (Edge Position Control) to align the width-direction centers of sheet layers of the graphite sheet during rewinding. In the thus obtained rolled graphite sheet, the height difference of the sheet edge in each of the roll side end faces was large but smaller than that in Example 4-1.

Example 4-4

A rolled graphite sheet was obtained in the same manner as in Example 2-4 except that EPC was not used at the time of rewinding and oscillation (oscillation winding) was performed in such a manner that the sheet edge was shifted by 0.5 mm per meter of the graphite sheet and the shift direction was changed every 2 m. In the thus obtained rolled graphite sheet, the height difference of the sheet edge in each of the roll end faces was larger than that in Example 2-4.

Various evaluations were performed on the rolled graphite sheets obtained in Examples described above, and results are shown in Table 4. It is to be noted that the maximum height difference of the sheet edge was measured in each of the side end faces of the rolled graphite sheet, and both the results are shown.

TABLE 4

| | GS width mm | GS length m | Rewinding tension N/cm | Moving distance mm | Maximum height difference before Test A mm | Maximum height difference before Test A/GS width % | Maximum height difference before Test A (other roll end face) mm | Maximum height difference before Test A (other roll end face)/GS width % | Maximum height difference after Test A mm | Maximum height difference after Test A/GS width % | Raised edge mm | Cracking at sheet side edges Number of cracks/100 m |
|---|---|---|---|---|---|---|---|---|---|---|---|---|
| Example 2-4 | 200 | 100 | 1.5 | 0 | 0.5 | 0.3% | 0.5 | 0.3% | 0.5 | 0.3% | 1 | 5 |
| Example 4-1 | 200 | 100 | 1.5 | 0 | 11 | 5.5% | 11 | 5.5% | 11 | 5.5% | 0.3 | 5 |
| Example 4-2 | 195-205 | 100 | 1.5 | 0 | 0.5 | 0.3% | 10.5 | 5.3% | 0.5 | 0.3% | 1 | 3 |
| Example 4-3 | 195-205 | 100 | 1.5 | 0 | 5.5 | 2.8% | 5.5 | 2.8% | 5.5 | 2.8% | 0.3 | 1 |
| Example 4-4 | 200 | 100 | 1.5 | 0 | 1 | 0.6% | 1 | 0.6% | 1 | 0.6% | 0.2 | 0 |

As can be seen from Table 4, a large height difference of the sheet edge (sheet shift) before the vibration test does not affect the moving distance of the outer end at the time of pulling and the ratio of maximum height difference after Test A/GS width. However, as can be seen from Examples 4-1, 4-3, and 4-4, the number of cracks at the sheet side edges can be reduced by reducing the sheet shift.

Example 5-1

The rolled graphite sheet obtained in Example 2-6 was placed inside a heat-shrinkable film formed into a cylindrical shape (PVC shrink tube manufactured by NIPPON HOSO-KIKAI CO., LTD, circumferential length of tube: 580 mm, width: 232 mm, thickness: 30 μm), and the heat-shrinkable film was shrunk by heating at 130° C. for 30 seconds with the use of a simple shrinking machine. In this way, a rolled graphite sheet was obtained whose outer surface was covered with a heat-shrinkable film but whose roll end faces and rod-shaped body were not covered.

Example 5-2

Covering with a heat-shrinkable film was performed in the same manner as in Example 5-1 except that the width of the heat-shrinkable film formed into a cylindrical shape was changed to 306 mm. In this way, a rolled graphite sheet was obtained whose outer surface and end faces were covered with a heat-shrinkable film but whose rod-shaped body was not covered.

Example 5-3

Covering with a heat-shrinkable film was performed in the same manner as in Example 5-1 except that the width of the heat-shrinkable film formed into a cylindrical shape was changed to 380 mm. In this way, a rolled graphite sheet was obtained whose outer surface, end faces, and rod-shaped body were covered with a heat-shrinkable film.

Example 5-4

Covering with a heat-shrinkable film was perforated in the same manner as in Example 5-1 except that the heat-shrinkable film was changed to HISHIPET (trademark) manufactured by Mitsubishi Plastics, Inc. (PET shrink tube, circumferential length of tube: 580 mm, width: 306 mm, thickness: 30 µm) and heated at 145° C. for 50 seconds with the use of Universal Shrink Tunnel manufactured by Kyowa denki Co., Ltd. In this way, a rolled graphite sheet was obtained whose outer surface and end faces were covered with a heat-shrinkable film but whose rod-shaped body was not covered.

The maximum height difference of the sheet edge in the roll end face (sheet shift) of each of the rolled graphite sheets of Examples 5-1 to 5-4 and Example 2-6 was measured. It is to be noted that the test performed before and after the measurement was changed from Test A to Test B that will be described below. The obtained results are shown in Table 5.

(Test B)
Support members were attached to the rod-shaped body protruding outward from the roll end faces of the rolled graphite sheet, and the rolled graphite sheet was hanged in midair in a state where the rod-shaped body was kept horizontal. The rolled graphite sheet was subjected to vibrations with an amplitude of 50 cm and a frequency of 50 reciprocations/min for 10 minutes in each of x, y, and z directions, in which the x direction was a length direction of the rod-shaped body, the y direction was a direction horizontally perpendicular to the length direction, and the z direction was a vertical direction.

surface and end faces of the rolled graphite sheet were covered with a heat-shrinkable film but the rod-shaped body was not covered, a difference of sheet shift/graphite sheet width before and after Test B is particularly small.

It is to be noted that in Examples 5-1 to 5-4, the rolled graphite sheet obtained in Example 2-6 was used, and therefore it is considered that the moving distance of the outer end at the time of pulling of each of the rolled graphite sheets of Examples 5-1 to 5-4 is the same as that of the rolled graphite sheet of Example 2-6, and the ratio of maximum height difference after Test A to GS width of each of the rolled graphite sheets of Examples 5-1 to 5-4 is smaller than that of the rolled graphite sheet of Example 2-6.

Examples 6-1 and 6-2

A rolled graphite sheet was obtained in the same manner as in Example 2-4 except that the rewinding tension was changed as shown in Table 6.

Each of the rolled graphite sheets of Examples 2-4 and Examples 6-1 and 6-2 was unwound to count the number of detects periodically occurring in the length direction of the graphite sheet with the use of a micrometer. The counted number of defects was expressed as the number of defects per $m^2$ of the graphite sheet and shown in Table 6.

Further, the graphite sheet was divided into 300 mm-long sections in its length direction, and the sections having a defect were regarded as unusable and the sections having no defect were regarded as usable. On the basis of the above judgement, the area ratio of the usable sections per 100 $m^2$ of the graphite sheet was calculated as a usable ratio, and the results are shown in Table 6.

TABLE 6

|  | GS width mm | GS length m | Rewinding tension N/cm | Periodic defects Number of defects/100 $m^2$ | Usable ratio % |
|---|---|---|---|---|---|
| Example 2-4 | 200 | 100 | 1.5 | 10 | 99.4% |
| Example 6-1 | 200 | 100 | 2.5 | 25 | 98.5% |
| Example 6-2 | 200 | 100 | 5.0 | 50 | 97.0% |

As can be seen from Table 6, when the rewinding tension is large, periodic defects are more likely to occur in the length direction of the graphite sheet.

TABLE 5

|  | GS width mm | GS length m | Rewinding tension N/cm | Width of heat-shrinkable film mm | Sheet shift before Test B mm | Sheet shift before Test B/GS width % | Sheet shift after Test B mm | Difference of sheet shift/GS width before and after Test B % |
|---|---|---|---|---|---|---|---|---|
| Example 5-1 | 200 | 400 | 1.5 | 232 | 2 | 1.0% | 15 | 6.5% |
| Example 5-2 | 200 | 400 | 1.5 | 306 | 2 | 1.0% | 2.5 | 0.3% |
| Example 5-3 | 200 | 400 | 1.5 | 380 | 2 | 1.0% | 15 | 6.5% |
| Example 5-4 | 200 | 400 | 1.5 | 306 | 2 | 1.0% | 2.5 | 0.3% |
| Example 2-6 | 200 | 400 | 1.5 | Not used | 2 | 1.0% | 30 | 14.0% |

As can be seen front Table 5, by covering the outer surface of the rolled graphite sheet with a heat-shrinkable film, a difference of sheet shift/graphite sheet width before and after Test B can be reduced, that is, a sheet shift at the time of transportation is much less likely to increase. Particularly, it can be seen that in Examples 5-2 and 5-4 in which the outer Reference Examples 1-1 to 1-5

Two long graphite sheet pieces having the same width were placed with a gap being provided therebetween, and the ends of both the sheet pieces were connected together with an adhesive tape as shown in FIG. 8 to obtain a longer graphite sheet. The maximum width of the gap (the maximum distance between the sheet pieces in the length direction of the sheet) is shown in Table 7. The adhesive tape used in Reference Examples 1-1 to 1-4 was a white light-permeable adhesive tape (manufactured by TERAOKA SEISAKUSHO CO., LTD., polyester film adhesive tape 631S #25, white, 15 mm wide), and the adhesive tape used in Reference Example 1-5 was a white light-permeable adhesive tape (manufactured by TERAOKA SEISAKUSHO CO., LTD., polyester film adhesive tape 631S #100, white, 15 mm wide).

The connecting portion in the obtained long graphite sheet was visually observed to evaluate light permeability, and the thickness of the obtained long graphite sheet was measured with a micrometer to evaluate flaws resulting from the connecting portion. The flaws resulting from the connecting portion include surface peeling of the graphite film and step-like flaws of 5 μm or more caused by wrinkles, and the graphite sheet with surface peeling or step-like flaws were evaluated as defective. The results are shown in Table 7.

TABLE 7

| | Maximum width of gap mm | Adhesive tape Color | Thickness (μm) | Light permeability | Flaws resulting from connecting portion |
|---|---|---|---|---|---|
| Reference Example 1-1 | 0.3 | White | 50 | OK | None |
| Reference Example 1-2 | 0.8 | White | 50 | OK | None |
| Reference Example 1-3 | 3 | White | 50 | OK | None |
| Reference Example 1-4 | 5 | White | 50 | OK | Surface peeling |
| Reference Example 1-5 | 1 | White | 150 | OK | Step-like flaw |

As can be seen from Table 7, when the two graphite sheets are connected together with a transparent adhesive tape in a state where a gap is provided between the sheets, the connecting portion has light permeability and therefore can be detected by an optical sensor.

However, Reference Example 1-4 revealed that when the maximum width of the gap exceeded 3 mm, the adhesive surface of the adhesive tape exposed in the gap adhered to a graphite sheet layer under the adhesive tape so that the surface of the graphite sheet was peeled off when the roll was unwound. Further, Reference Example 1-5 revealed that when the thickness of the adhesive tape was too large, a level difference was caused by the adhesive tape, which might cause periodic defects.

REFERENCE CITATION LISTS

10 Rolled graphite sheet
11 Rod-shaped body
12 Graphite sheet
13 Roll end face
14 Support member
51, 51a, 51b Protective film
71 Heat-shrinkable film
81 Adhesive tape
82 Gap Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A rolled graphite sheet comprising:
   a rod-shaped body; and
   a graphite sheet having a length of 1 m or more and a width shorter than the length,
   wherein the graphite sheet is wound around the rod-shaped body and is rolled in a length direction,
   wherein, when a length direction-end of the graphite sheet is pulled with a force of 1.5 N/cm in a direction parallel to a tangent of a cross-sectional circle of the rolled graphite sheet while fixing the rod-shaped body, the end moves 5 mm or less in the direction parallel to the tangent of the circle,
   wherein one or more width-direction edges of the graphite sheet are perpendicular to the length direction-end of the graphite sheet,
   wherein the rolled graphite sheet has one or more roll end faces, the width-direction edges of the graphite sheet being stacked at the roll end faces of the rolled graphite sheet,
   wherein an outer surface and the roll end faces of the rolled graphite sheet are covered with a heat-shrinkable film,
   wherein the rod-shaped body protrudes outward from the roll end faces of the rolled graphite sheet,
   wherein a surface of the rod-shaped body protruding outward is not covered with the heat-shrinkable film, and
   wherein a value determined by subtracting a maximum height difference of the width-direction-edge of the graphite sheet in one of the roll end faces of the rolled graphite sheet measured before Test B from that measured after Test B is 10% or less of the width of the graphite sheet,
   wherein the maximum height difference is measured in a direction parallel to an axis of the rolled graphite,
   wherein Test B comprises subjecting the rolled graphite sheet to vibrations having an amplitude of 50 cm and a frequency of 50 reciprocations/min for 10 minutes in each of x, y, and z directions in a state where the rod-shaped body is kept horizontal,
   wherein the x direction is a length direction of the rod-shaped body, the y direction is a horizontal direction perpendicular to the x direction, and the z direction is a vertical direction perpendicular to both the x direction and the y direction.

2. The rolled graphite sheet according to claim 1, wherein a maximum height difference on an outer surface of the rolled graphite sheet is 0 to 3 mm within a near-edge region, wherein the maximum height difference is measured in a direction perpendicular to an axis of the rolled graphite, and the near-edge region is a region of the outer surface extending 10 mm or less from a width-direction edge of the outer surface of the rolled graphite sheet.

3. The rolled graphite sheet according to claim 1, wherein the graphite sheet has a density of 1.2 g/cm³ or more.

4. The rolled graphite sheet according to claim 1, further comprising one or more protective films laminated on one or more side edge regions of the graphite sheet, wherein the side edge region is a region of a front or back surface of the graphite sheet that is adjacent to a width-direction edge of the graphite sheet.

5. The rolled graphite sheet according to claim 4, wherein the one or more protective films protrude outward from a width-direction edge of the graphite sheet.

6. The rolled graphite sheet according to claim 4, wherein the one or more protective films have adhesiveness and are capable of being peeled from the graphite sheet.

7. The rolled graphite sheet according to claim 1, wherein a maximum height difference of width-direction edges of the graphite sheet in one of roll end faces of the rolled graphite sheet is 0 to 2.5% of the width of the graphite sheet, wherein the maximum height difference is measured in a direction parallel to an axis of the rolled graphite.

8. The rolled graphite sheet according to claim 1, wherein a maximum height difference of width-direction edges of the graphite sheet in each of roll end faces of the rolled graphite sheet is 0 to 2.5% of the width of the graphite sheet, wherein the maximum height difference is measured in a direction parallel to an axis of the rolled graphite.

9. The rolled graphite sheet according to claim 1, wherein the heat-shrinkable film is a uniaxially-stretched film.

10. The rolled graphite sheet according to claim 1, wherein a number of defects that periodically occur in the length direction of the graphite sheet is $25/m^2$ or less.

11. The rolled graphite sheet according to claim 1, wherein the graphite sheet comprises two or more graphite sheets connected together in the length direction with a transparent adhesive tape, and wherein two adjacent graphite sheets are separated by a gap such that a distance between the two adjacent graphite sheets is 0.3 to 3 mm.

12. The rolled graphite sheet according to claim 1, wherein the graphite sheet comprises two or more graphite sheets connected together in the length direction with an adhesive tape, and wherein two adjacent graphite sheets are separated by a gap such that a distance between the two adjacent graphite sheets is 0.3 to 3 mm.

* * * * *